(12) United States Patent
Cusumano et al.

(10) Patent No.: US 9,079,582 B2
(45) Date of Patent: Jul. 14, 2015

(54) METHOD AND SYSTEM TO ENABLE A COAST-DOWN MODE

(71) Applicant: Ford Global Technologies, LLC, Dearborn, MI (US)

(72) Inventors: Thomas Joseph Cusumano, Royal Oak, MI (US); Stefan Paul Pototschnik, Superior Township, MI (US); Jonathan Andrew Butcher, Farmington, MI (US); Paul Stephen Bryan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/014,578

(22) Filed: Aug. 30, 2013

(65) Prior Publication Data

US 2015/0066261 A1   Mar. 5, 2015

(51) Int. Cl.
*B60W 20/00* (2006.01)

(52) U.S. Cl.
CPC ......... *B60W 20/108* (2013.01); *B60W 2510/06* (2013.01); *B60W 2510/08* (2013.01); *Y10S 903/902* (2013.01)

(58) Field of Classification Search
CPC ............. B60W 2510/08; B60W 2510/06; B60W 10/08; B60W 10/10; B60W 30/18; B60W 20/00; B60W 10/115; B60K 6/365; B60K 6/445; B60K 6/448; B60K 6/46; B60K 6/48; B60K 6/54; B60K 6/547; B60L 11/123; B60L 11/14; B60L 11/1811
USPC ......... 701/22; 477/3, 110, 113; 903/903, 904, 903/910, 930; 475/5
See application file for complete search history.

(56) References Cited

U.S. PATENT DOCUMENTS

| | | | |
|---|---|---|---|
| 7,967,726 B2 * | 6/2011 | Kim | 477/118 |
| 2003/0045389 A1 * | 3/2003 | Kima | 475/5 |
| 2008/0312029 A1 | 12/2008 | Matsubara et al. | |
| 2009/0088290 A1 * | 4/2009 | Tabata et al. | 477/5 |
| 2012/0207620 A1 * | 8/2012 | Dalum et al. | 417/44.1 |

* cited by examiner

*Primary Examiner* — Marthe Marc-Coleman
(74) *Attorney, Agent, or Firm* — David B. Kelly; Brooks Kushman P.C.

(57) ABSTRACT

A vehicle includes an engine and a non-selectable-gear transmission having an electric machine mechanically coupled to the engine. The vehicle may have one or more controllers programmed to, in response to a request for passive neutral mode, pull-down the engine and inhibit engine pull-up while disabling the electric machine such that the vehicle coasts with minimal rotational inertia and electrical losses. The one or more controllers may be further programmed to, in response to a subsequent request for drive mode during the passive neutral mode, permit engine pull-up while enabling the electric machine such that the vehicle resumes drive.

18 Claims, 7 Drawing Sheets

METHOD AND SYSTEM TO ENABLE A COAST-DOWN MODE

TECHNICAL FIELD

Embodiments of the present invention generally relate to the determination of vehicle track road load and coefficient data for a dynamometer.

BACKGROUND

Single speed electric powertrains in battery electric and hybrid electric vehicles pose issues when trying to determine vehicle road-loads on the track as well as the subsequent coast-down road-load determination on a chassis dynamometer due to the fact that these single speed devices often have no true neutral separation of the driveline from the vehicle motion. Therefore, the electric machines and the large rotating inertia and electrical losses therein affect the determination of true road loads, e.g., aerodynamics and rolling resistance, which is determined by time-based coasting of the vehicle from a high speed to a low speed. A proper torque profile of a vehicle coast down from 70 mph to 10 mph in neutral should appear smooth, with no torque fluctuations throughout.

Performing a proper torque profile for a coast-down determination on a hybrid electric transmission vehicle may require a road-load determination procedure that includes turning the vehicle power off (i.e., ignition off) so that no power is being supplied to the electric machine(s). The "powerless" vehicle with no power to the vehicle computing system may be placed in neutral and pushed up to 75 MPH using another vehicle. Once at a high speed steady state, the other vehicle may allow the powerless vehicle to coast down to a low speed state as per the road-load determination procedure. This procedure produces a repeatable and smooth torque response from the wheels that best mimics the natural vehicle road-load data. However, this procedure must be repeated several times to complete the test which requires additional resources including another vehicle to push the powerless test hybrid vehicle. The powerless test hybrid vehicle may disable driver assist systems and/or subsystems, which may result in an undesirable driving experience during the road-load determination procedure.

SUMMARY

A vehicle may include an engine and a non-selectable-gear transmission having an electric machine mechanically coupled to the engine. The vehicle may have one or more controllers programmed to, in response to a request for passive neutral mode, pull-down the engine and inhibit engine pull-up while disabling the electric machine such that the vehicle coasts. The one or more controllers may be further programmed to, in response to a subsequent request for drive mode during the passive neutral mode, not inhibit engine pull-up while enabling the electric machine such that the vehicle resumes drive.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
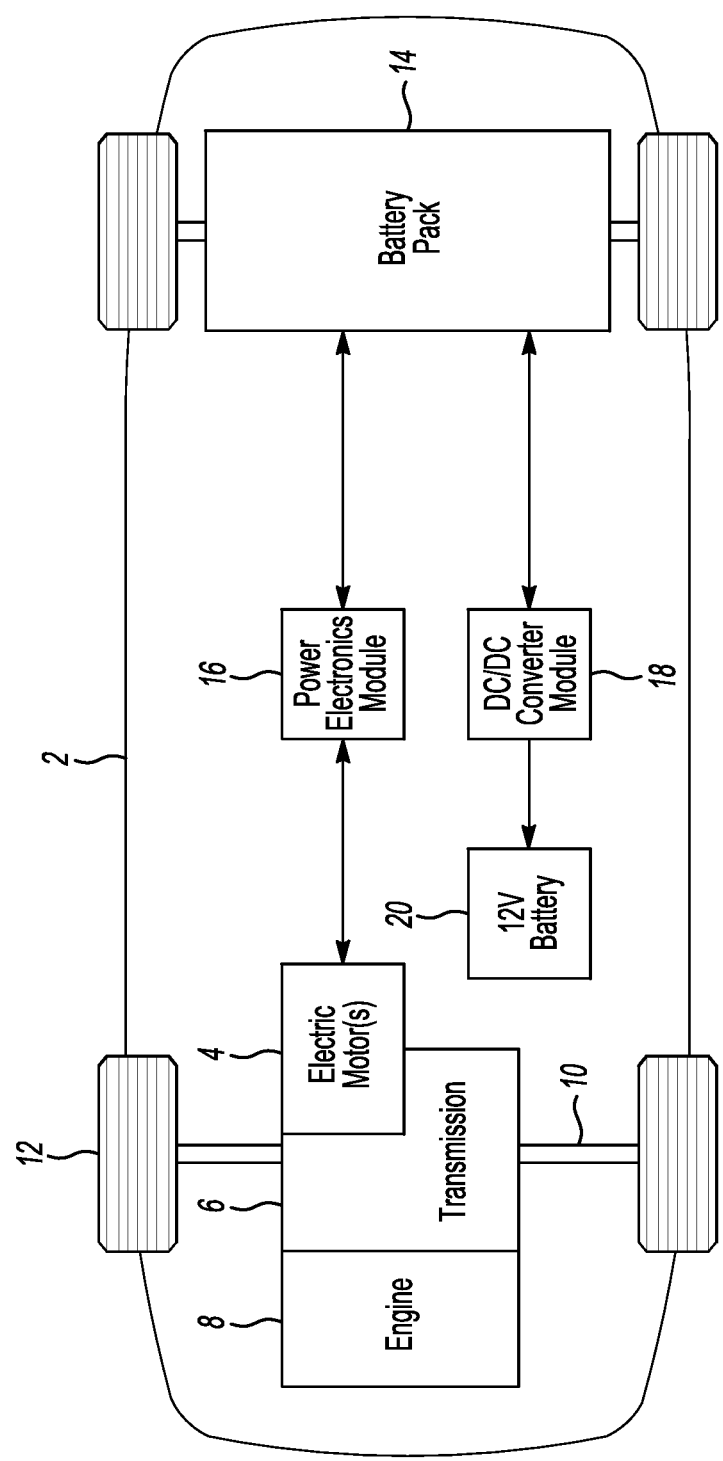
FIG. 1 is a diagram of a hybrid-electric vehicle illustrating typical drivetrain and energy storage components.

FIG. 1 depicts a typical hybrid-electric vehicle. A typical hybrid-electric vehicle 2 may comprise one or more electric motors 4 mechanically connected to a hybrid transmission 3. In addition, the hybrid transmission 6 is mechanically connected to an engine 8. The hybrid transmission 6 is also mechanically connected to a drive shaft 10 that is mechanically connected to the wheels 12. In another embodiment not depicted in the illustration, the hybrid transmission may be a non-selectable gear transmission that may include at least one electric machine. The electric motors 4 can provide propulsion and deceleration capability when the engine 8 is turned on or off. The electric motors 4 also act as generators and can provide fuel economy benefits by recovering energy that would normally be lost as heat in the friction braking system. The electric motors 4 may also provide reduced pollutant emissions since the hybrid electric vehicle 2 may be operated in electric mode under certain conditions.

The battery pack 14 stores energy that can be used by the electric motors 4. A vehicle battery pack 14 typically provides a high voltage DC output. The battery pack 14 is electrically connected to the power electronics module 16. The power electronics module 16 is also electrically connected to the electric motors 4 and provides the ability to bi-directionally transfer energy between the battery pack 14 and the electric motors 4. For example, a typical battery pack 14 may provide a DC voltage while the electric motors 4 may require a three-phase AC current to function. The power electronics module 16 may convert the DC voltage to a three-phase AC current as required by the electric motors 4. In a regenerative mode, the power electronics module 16 will convert the three-phase AC current from the electric motors 4 acting as generators to the DC voltage required by the battery pack 14.

In addition to providing energy for propulsion, the battery pack 14 may provide energy for other vehicle electrical systems. A typical system may include a DC/DC converter module 18 that converts the high voltage DC output of the battery pack 14 to a low voltage DC supply that is compatible with other vehicle loads. Other high voltage loads may be connected directly without the use of a DC/DC converter module 18. In a typical vehicle, the low voltage systems are electrically connected to a 12V battery 20.

Figure 2:
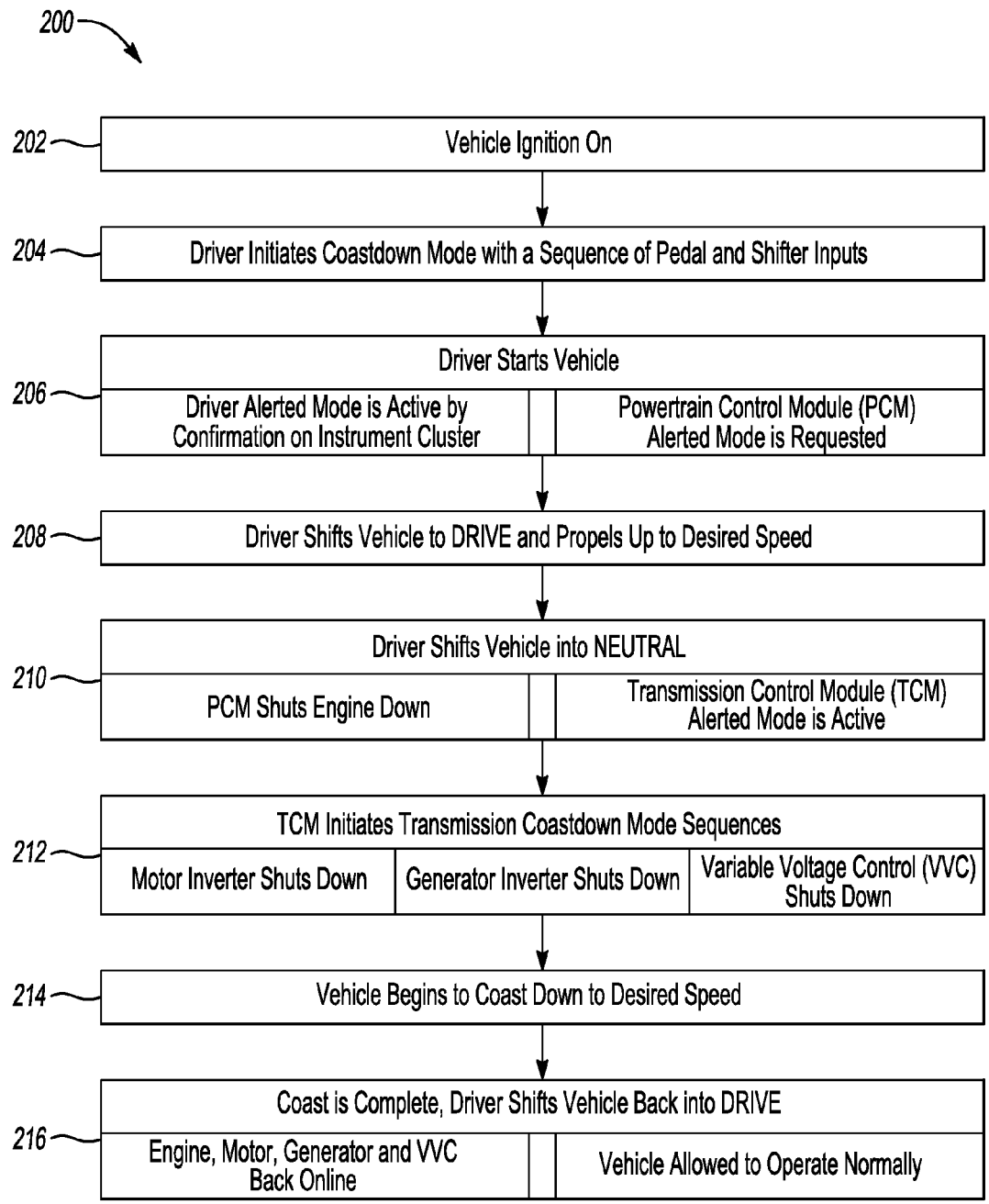
FIG. 2 is a flow chart of an algorithm for initializing and enabling a passive neutral coast-down control mode for a hybrid vehicle.

FIG. 2 is a flow chart of an algorithm for initializing and enabling coast-down control mode for a hybrid vehicle. The method is implemented using software code contained within the vehicle control module, according to one or more embodiments. In other embodiments, the method 200 is implemented in other vehicle controllers, or distributed amongst multiple vehicle controllers.

Referring again to FIG. 2, the vehicle and its components illustrated in FIG. 1 are referenced throughout the discussion of the method to facilitate understanding of various aspects of the present invention. The method of enabling a cost-down mode in the hybrid electric vehicle may be implemented through a computer algorithm, machine executable code, or software instructions programmed into a suitable programmable logic device(s) of the vehicle, such as the vehicle control module, the hybrid control module, other controllers in communication with vehicle computing systems, or a combination thereof. Although the various steps shown in the flowchart diagram 200 appear to occur in a chronological sequence, at least some of the steps may occur in a different order, and some steps may be performed concurrently or not at all.

The algorithm may be initiated by the driver using an accelerator pedal and/or gear selector sequence. The driver's sequence input using an accelerator pedal and/or gear selector may be communicated to the one or more control modules in a vehicle by using the controller area network (CAN) bus. For example, a powertrain may have several control modules including, but not limited to, a powertrain control module communicating with the accelerator pedal, and a transmission control module communicating with the gear selector. The powertrain control module (PCM) may receive a series of handshakes initiated by the driver and communicate to the transmission controller to enter into a mode which is intended to simulate a true neutral separation of the transmission to the road wheels.

At step 202, the algorithm may be initialized once the vehicle ignition is in the on position. The ignition system may include, but is not limited to, a key, keyless, and/or wireless start system. Once the ignition is on and power is supplied to the vehicle computing system, the driver may begin to initiate the coast-down mode procedure by a series of accelerator pedal thrusts and gear shift changes, in the correct sequence, in order to prevent the unintended activation of this mode at step 204. The series of maneuvers to initiate a passive neutral coast-down mode may be defined by a predetermined sequence of accelerator pedal and shifter inputs stored in one or more control modules.

For example, within a calibratable time period from when the ignition is turned on and the vehicle is in accessory mode, the driver may fully depress the accelerator pedal and hold for a calibratable period of time. After the driver has held the fully depressed accelerator for a period of time, the driver may release the pedal. Within a predefined amount of time from when the driver releases the accelerator pedal, the driver may again fully depress the accelerator pedal and hold for a calibratable period of time. After a calibratable number of accelerator pedal depression steps, using the Park Reverse Neutral Drive Low (PRNDL) powertrain gear selector, the driver may select the Low gear within a predefined calibratable time period of the last fully depressed accelerator pedal and hold maneuver. Once the driver has selected the Low gear within a predefined calibratable time, he must depress and hold the accelerator pedal for a calibratable period of time. After the calibratable period of the Low gear with the depressed accelerator pedal, the driver may set the PRNDL in Park within a calibratable amount of time.

At step 206, the driver may start the vehicle, and the vehicle computing system may initiate the coast-down mode to be activated. The system may allow the PCM to transmit an activation signal to the electric transmission control module (TCM). The system may have the TCM transmit that it has received the activation signal to enable the coast-down mode. The system may indicate that the driver has entered the coast-down mode by presenting a message in the instrument panel. The message may include, but is not limited to, flashing an indicator lamp, a text message displayed on a screen, and/or an audio message. The coast-down mode is now initiated and in stand-by waiting for the next maneuver to complete the coast-down mode activation.

At step 208, the driver may select the Drive gear and accelerate the vehicle to the desired speed needed when performing the road-load determination procedure. Once the vehicle reaches the desired steady state speed, the driver may active the coast-down mode by shifting the PRNDL to the Neutral position at step 210. Once the vehicle computing system detects that the transmission is in neutral, the coast-down mode is enabled by having the TCM send a request to the PCM to shut down the gas engine (if equipped). The vehicle system may also initiate the TCM to transmit a request to one or more control modules for shutting down and disabling the electric motor inverter circuit, generator inverter circuit, and/or the variable voltage controller at step 212.

At step 214, the vehicle computing system may allow a driver to begin coasting the vehicle down to a desired calibratable speed before the one or more control modules, engine, and/or electric motors are powered back on. The coast-down mode algorithm allows a vehicle computing system to shutdown powertrain components including the engine and/or electric machine(s) from the driveline. The shutdown of the engine and/or electric machine eliminates their large rotating inertia and electrical losses therein which effect the determination of true vehicle road loads.

At step 216, once the driver shifts the transmission out of neutral, the TCM activates the motor and generator inverter circuits, enabling the electric drives and the gas engine (if equipped in the vehicle) returns to a normal state of operation. In another example, the TCM may activate the motor and generator inverter circuits if the vehicle speed reaches a predefined calibratable value. This cycle can be repeated as many times as necessary to complete the coast-down test. Once the vehicle is turned off (key off ignition), in a subsequent key-on of the vehicle, the coast-down mode may now be disabled, no longer in stand-by mode or in active state (i.e., regardless of the transmission gear selector state). To enable the mode again, the driver must initiate the PCM handshake sequence following the above maneuvers using the accelerator pedal and PRNDL gear selector.

Figure 3:
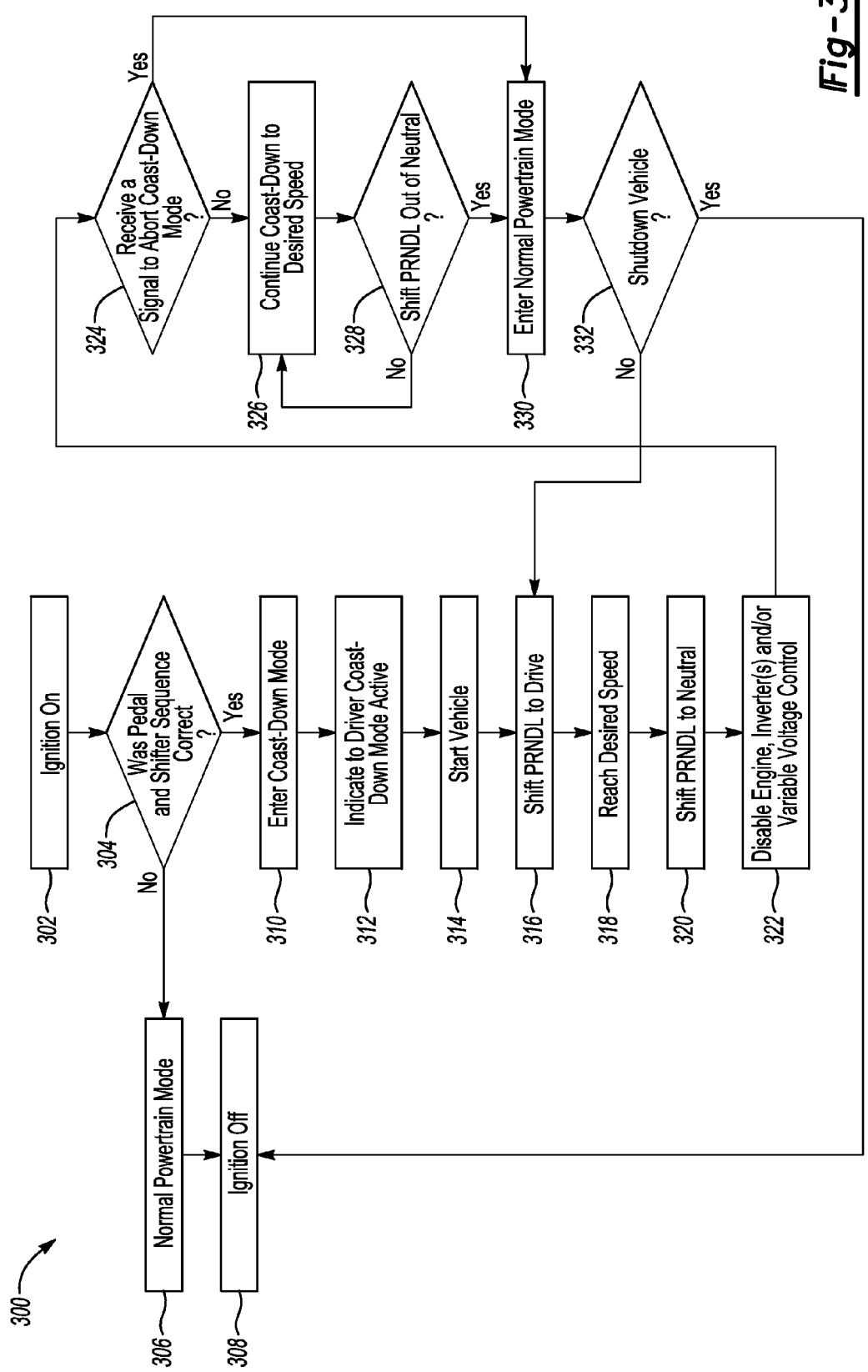
FIG. 3 is a flow chart of an algorithm for controlling a coast-down powertrain mode for a hybrid vehicle.

FIG. 3 is a flow chart of an algorithm for controlling a coast-down determination powertrain mode for a hybrid vehicle. The algorithm for enabling cost-down mode for road-load determination may be used in one or more hybrid powertrain configurations. The one or more hybrid powertrain configurations include, but are not limited to, a power split configuration, a mild parallel configuration, a power-split/series-parallel configuration, a plug-in electric configuration, a fuel cell configuration, and/or a series hybrid configuration.

At step 302, the vehicle computing system may begin the enabling of the hybrid electric vehicle coast-down mode once the vehicle ignition is in a key-on state and in accessory mode. When a vehicle is in accessory mode certain control modules are powered allowing communication between one or more system, subsystem, and/or components in a vehicle. A vehicle occupant may begin a sequence of accelerator and/or brake pedal maneuvers within a calibratable amount of time after the vehicle ignition is on to begin initiation to enter the coast-down mode at step 304.

For example, the driver may fully depress the brake pedal after a minimum predetermined amount of time, but before a maximum predetermined amount of time, from when the ignition is turned on. The driver may hold the fully depressed brake pedal for a calibrated period of time before releasing it so that it returns to its initial resting position. After the release of the brake pedal, the driver must set the PRNDL to the low gear and fully depress the accelerator pedal within a calibratable amount of time. The driver must then release the accelerator pedal after a minimum predetermined amount of time but before a maximum predetermined amount of time when the PRNDL was placed into low gear. Once the driver releases the accelerator pedal, within a calibratable amount of time, he must set the PRNDL to the park gear. If the pedal and shifter sequence is correct, the vehicle computing system should now indicate that coast-down mode is initiated and is in stand-by at step 310.

At step 306, if the pedal and shifter sequence was incorrect or not done within the calibratable amount of time, then the powertrain system may operate in a normal state without the coast-down mode being activated in a stand-by mode. The normal powertrain mode may be activated by the vehicle computing system and not allow the driver to re-enter the coast-down mode pedal sequence to initiate the feature until the ignition is keyed off at step 308.

At step 312, if the pedal and shifter sequence was correct, the vehicle computing system may indicate that the coast-down feature is in standby mode by flashing a malfunction indication lamp (MIL) a predefined number of flashes in a predefined amount of time. The vehicle computing system may allow the coast-down mode to be active until the ignition is selected to OFF or a calibratable timer expires.

At step 314, the driver may key the ignition to start the vehicle within a calibratable amount of time of the MIL flashing. The vehicle may be driven normally with the driver shifting the PRNDL to the reverse and/or drive gear(s) at step 316. Since the coast-down mode has been initiated by the driver performing the pedal and shifter sequence while starting the vehicle within a calibratable amount of time after the MIL light has flashed, the vehicle computing system may allow activating the hybrid electric vehicle coast-down mode based on one or more variables. The one or more variables to activate the coast-down mode may include, but are not limited to, the vehicle to reach a certain vehicle speed that is calibratable at step 318. Once the calibratable vehicle speed is reached, the driver may shift the PRNDL to Neutral to activate the coast-down mode at step 320.

At step 322, the vehicle computing system may activate coast-down mode by disabling the engine, electric machine inverter(s), and/or shutting down the variable voltage controller. The vehicle may receive one or more signals that may abort the coast-down mode at step 324. The one or more signals that may abort the coast-down mode may include, but are not limited to, the driver shifting out of Neutral, the vehicle speed reaching a calibratable value, and/or input from the brake/accelerator pedal. If the vehicle receives an abort coast-down mode request, the vehicle computing system may control the powertrain to be driven in normal operation mode once again.

At step 326, the vehicle may continue to coast-down without the electric machine and/or engine influencing the torque delivered to the wheels. The disabling of the electric machine and engine eliminates their respective large rotating inertia and electrical losses therein which effect the determination of true vehicle road loads. The driver may shift the PRNDL out of Neutral to abort the coast-down mode to allow the system to turn on the electric machine inverters and variable voltage controller, and control the engine to a normal operation mode at step 328.

At step 330, the driver may continue to repeat the road-load determination procedure as much as he or she would like during that key cycle of the vehicle computing system and/or drive in the normal powertrain mode with the coast-down mode active in standby. The driver may operate the vehicle in the normal powertrain mode by avoiding shifting the PRNDL in Neutral while at a calibratable speed at step 328. The driver may turn the ignition off to disable the coast-down mode at step 332.

Figure 4:
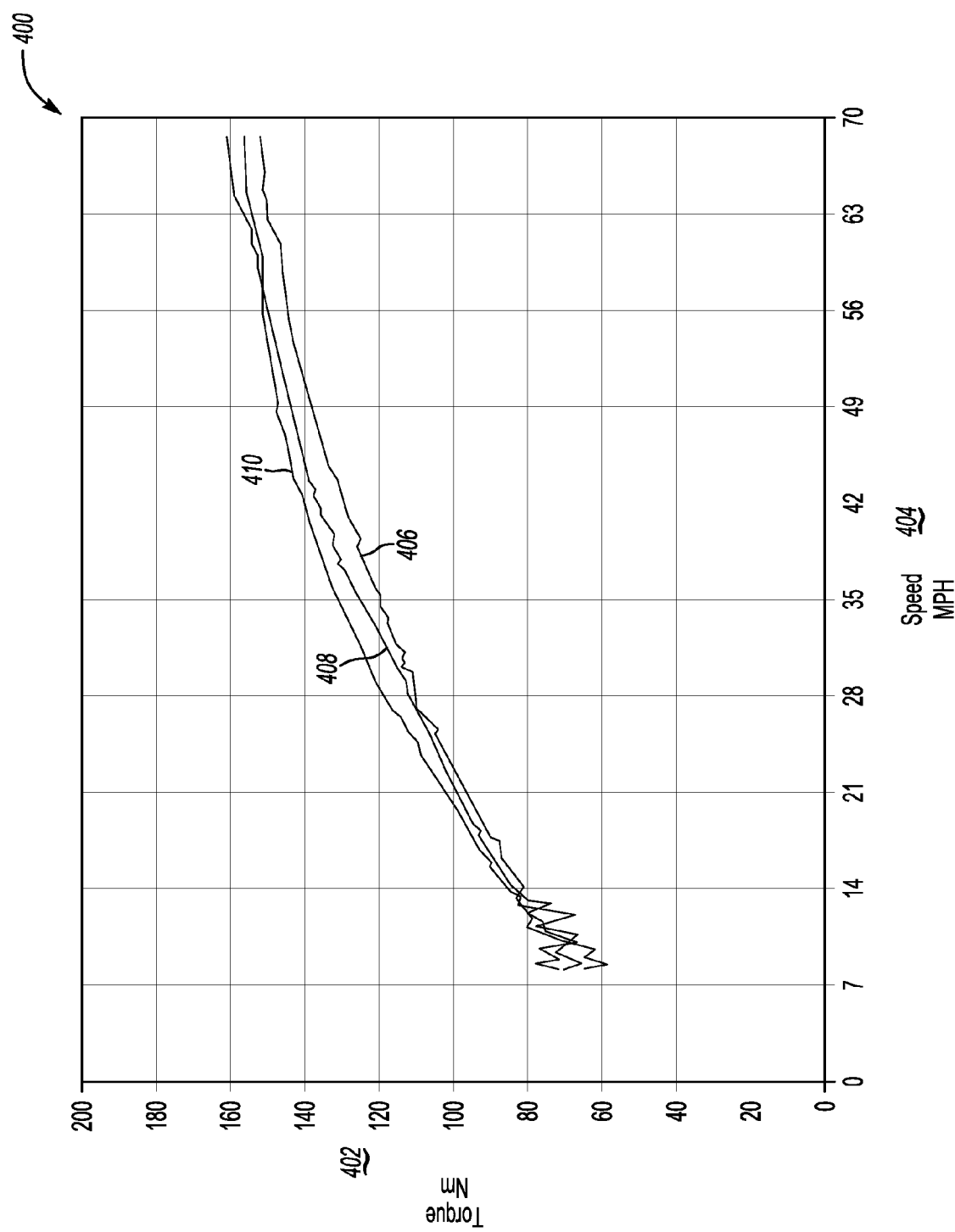
FIG. 4 is a graph illustrating a coast-down procedure when the vehicle ignition is off and the vehicle computing system is powered-down.

FIG. 4 is a graph illustrating the coast-down procedure for a hybrid vehicle when the vehicle ignition is off and the vehicle computing system is powered down. The coast-down procedure with ignition off allows the electric machine and engine to be in a shutdown state, therefore eliminating engine turn on/off events, electric machine(s) trying to control torque being delivered, and/or wheel torque fluctuation based on one or more features/functions in the powertrain system. The ignition off coast-down procedure may cause other driver assistant system to be disabled including, but not limited to, power steering, antilock braking, and/or safety restraining systems.

The coast-down procedure with vehicle ignition off may require an additional vehicle to push the test vehicle to the required maximum speed. In another example, the vehicle may be off and put in neutral on a dynamometer propelling the vehicle to the maximum coast-down speed called out in the procedure and coasting down to a minimum speed. If the test vehicle is being pushed to the required maximum test speed by an additional vehicle, the test vehicle may have all driver assisted systems in a power down state. Once the vehicle reaches the necessary maximum speed to start the coast-down procedure, the additional vehicle may brake so that it is no longer pushing the test vehicle while allowing the test vehicle to begin the coast-down.

The hybrid electric vehicle coast-down procedure with ignition off and requiring a "push" from an addition vehicle is illustrated in graph 400 having a y-axis of front wheel torque 402 and an x-axis of vehicle speed 404 measured in miles per hour (MPH). The coast-down procedure may require more than one test so that additional data may be recorded and used to verify accuracy in the test results. For example, in the first test 406 of the coast-down procedure, the vehicle in neutral is powered down in an ignition off state and pushed by an additional vehicle to a maximum speed (e.g. 70 MPH) and is allowed to coast to a minimum speed (e.g. 10 MPH) to allow the calculation of an accurate road load for the vehicle being tested. The second test 408 follows the same procedure of running the vehicle speed up to a maximum speed using an additional vehicle, and the results are consistent with the first test 406. The third test 410 follows the constancy of the first test 406 and second test 408 showing that the vehicle coast-down procedure with ignition off provides accurate road load calculations for the hybrid electric vehicle. This test procedure, however, requires an additional vehicle to push the test vehicle and several driver assist systems to be powered off in the test vehicle during the test procedure.

Figure 5:
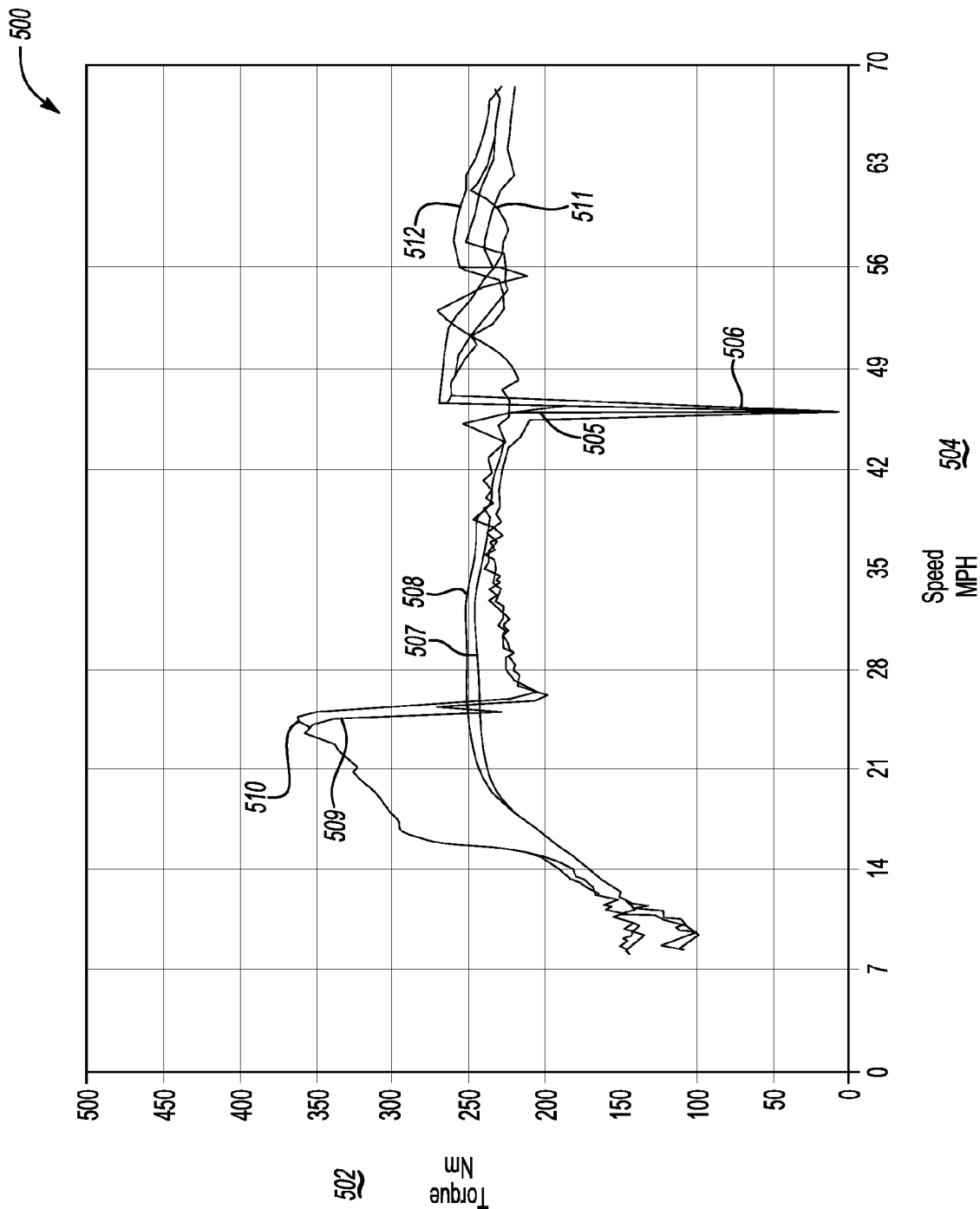
FIG. 5 is a graph illustrating the coast-down procedure when the vehicle ignition is on and the vehicle computing system is powered-up.

FIG. 5 is a graph illustrating the coast-down procedure to calculate road-load for a hybrid vehicle when the vehicle ignition is on. The vehicle ignition on allows power to be delivered to the vehicle computing system which includes, but is not limited to, the engine control module, transmission control module, and/or antilock brake system. The graph 500 illustrates a vehicle which has reached the required maximum speed called out in the coast-down test procedure to begin the coast-down for calculating road-load for that particular hybrid electric vehicle. The vehicle is in neutral coasting from the maximum speed to the minimum speed with all control modules powered on.

The coast-down procedure with ignition on allows the electric machine and engine to be in a pull-up state (powered on)—allowing engine turn on/off events and electric machine control of the torque being delivered to the wheels during the coast-down. The engine turning on/off and the electric machine control may cause wheel torque fluctuations as a result during the coast-down procedure with ignition on and the powertrain system in neutral. The ignition on during the coast-down procedure may cause the measuring and calculating of the vehicle road-load to be inconsistent based on one or more features/functions in the powertrain system influencing wheel torque.

For example, in this coast-down mode illustration 500, the electric machine(s) and/or generator may still affect wheel torque in a hybrid powertrain by requesting engine speed by the generator to charge the battery. In another example, the electric machine/generator may actively try to maintain and control zero wheel torque when the system is in neutral. This method may also cause variability with motor control calibration maturity because coast-down results may change based on software updates and calibration changes.

The hybrid electric vehicle coast-down procedure with ignition on may add torque fluctuation in the powertrain system as illustrated in graph 500 giving the results a non-characteristic shape because the powertrain system is influencing the wheel speed. The graph 500 is represented by having a y-axis of front wheel torque 502 and an x-axis of vehicle speed 504 measured in miles per hour (MPH). The graph 500 illustrates the torque fluctuation caused by the powertrain system requesting one or more events including, but not limited to, an engine pull-up 509, a request to turn on the engine for providing power to the battery 510, the engine pull-down 505, a request to turn off the engine 506, and/or the electric machine torque control 507, 508, 511, 512 attempting to control the system to zero torque during a coast-down event.

The engine pull-up requests 509, 510 are shown on the graph by two different test runs where the request is received by the system, and commands an engine start during a coast-down mode with the vehicle in the neutral gear and the ignition is on. An example of an engine pull-up request may be the powertrain system receiving a request that the high-voltage battery state of charge is low and may need to be charged by the powertrain. The engine pull-up request 509, 510 increases the torque, which may cause a fluctuation in the wheel torque causing an incorrect calculation for road-load.

The engine pull-down request 505, 506 is shown on the graph by two different test runs where the request shuts off the engine because the powertrain system may calculate that there is not a need for motive power from the engine during coast-down. The powertrain system may also request an engine pull-down 505, 506 during a coast-down procedure if the high voltage battery state of charge is at an acceptable level of charge. The engine pull-down 505, 506 may decrease the torque in the hybrid powertrain system, which may cause a fluctuation in the wheel torque causing an inconsistent and incorrect calculation for vehicle road-load.

The electric machine torque control 507, 508, 511, 512 for a hybrid powertrain system is shown on the graph by several test runs where the powertrain system may attempt to control zero torque because there is not a need for motive power during coast-down. The electric machine torque control may cause wheel torque fluctuation due to the motor attempting (but not fully succeeding) to control to zero torque while the vehicle is changing wheel speed from the maximum speed reached in the coast-down procedure (e.g. 70 mph) to the minimum speed (e.g. 10 mph). The graph 500 illustrates the variability of torque on the wheels while trying to coast a vehicle down in neutral without a coast-down mode that powers down one or more control modules that may cause torque fluctuation during the coast-down from the maximum vehicle speed to the minimum vehicle speed when calculating vehicle road load. The coast-down mode procedure with the hybrid vehicle in neutral gear and ignition on may inaccurately depict the role of the environment (i.e., aerodynamics, tire friction, etc.) on the total vehicle load when calculating road loads for a hybrid electric vehicle.

Figure 6:
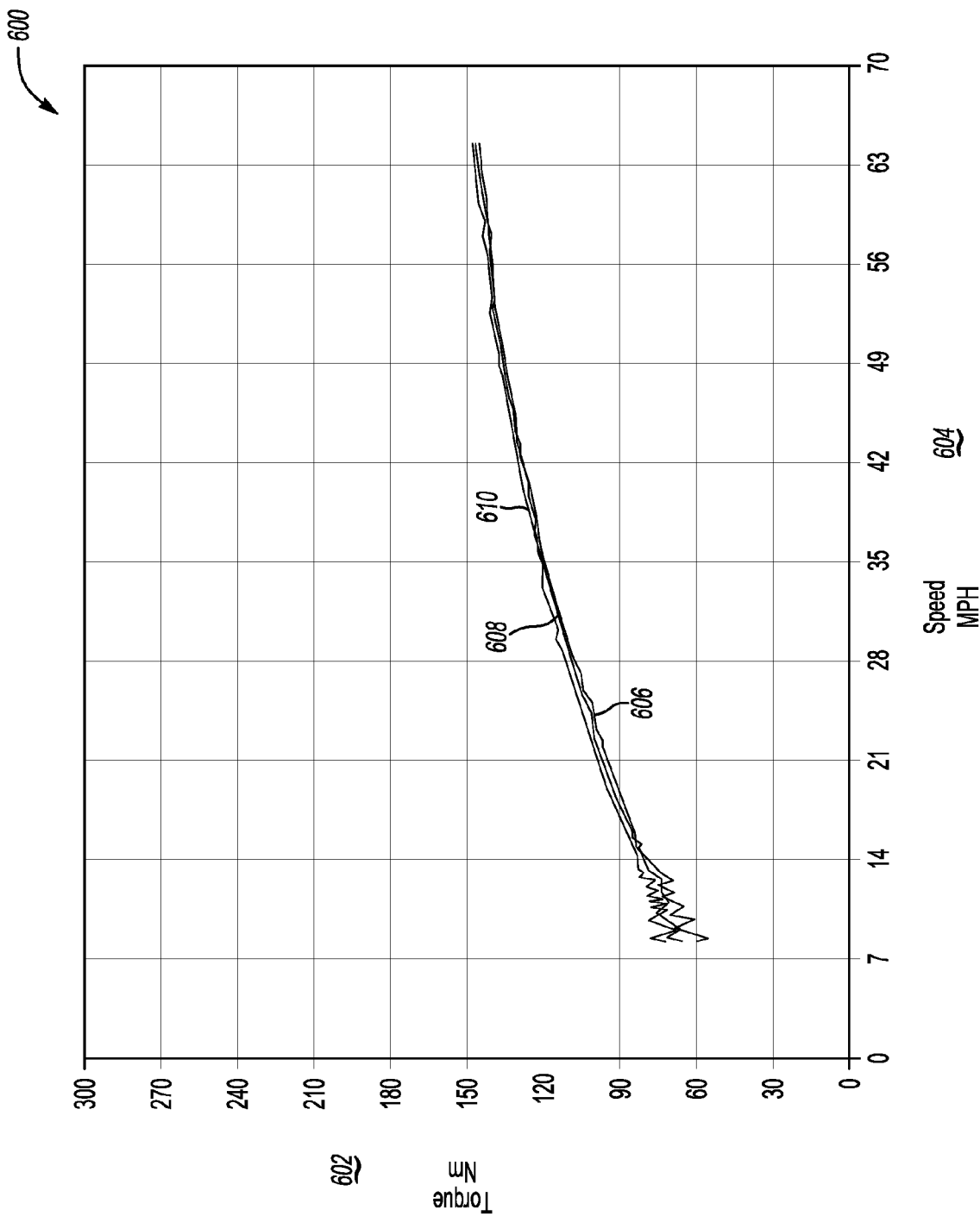
FIG. 6 is a graph illustrating the coast-down procedure using the coast-down control function to enable a passive neutral mode.

FIG. 6 is a graph illustrating the coast-down procedure using the coast-down control mode for a hybrid vehicle. The coast-down control state may request a passive neutral mode by having one or more control modules powered down. The one or more control modules powered down may disable the electric machine(s) and engine while the vehicle ignition is on. The disabling of the electric machine(s) and engine may include, but is not limited to, the powering down of the engine control module, transmission control module, variable voltage control module, and/or the hybrid control module. The disabling of the one or more modules may cause the motor inverters to shut down and inhibit the engine from starting.

The passive neutral mode in a hybrid electric vehicle allows a vehicle to drive itself up to the maximum speed requested by the coast-down procedure, however when activated (by placing the gear shifter in neutral), the motor inverters and engine shut down. The coast-down passive neutral mode may produce torque repeatability of a coast-down test procedure results because of the elimination of wheel torque fluctuation caused by the electric machine(s) and engine. The coast-down mode, with ignition on and one or more control modules disabled, allows for the test results torque values 606, 608, 610 to be unburdened of variability due to calibration when calculating road-load for a hybrid electric vehicle.

The hybrid electric vehicle coast-down procedure with ignition on and disabling the electric machine and engine is illustrated in graph 600 having a y-axis of front wheel torque 602 and an x-axis of vehicle speed 604 measured in miles per hour (MPH). The coast-down procedure may require more than one test so that additional data may be recorded and used to verify accuracy in the test results. For example, in the first test 606 of the coast-down procedure, the vehicle is powered up in an ignition on state and driven in a normal powertrain vehicle state to a maximum speed (e.g. 70 MPH) called out by the coast-down procedure. The vehicle is then put in a passive neutral mode to disable one or more control modules to eliminate torque fluctuation at the wheels while coasting to a minimum speed (e.g. 10 MPH). The first test result 606 allows the calculation of an accurate road load for the vehicle being tested. The second test 608 follows the same procedure of running the vehicle speed up to a maximum speed in a normal hybrid powertrain operation mode and put into a passive neutral state to obtain results that are consistent with the first test 606. The third test 610 follows the first test 606 and second test 608 showing that the vehicle coast-down procedure with ignition on and a passive neutral mode may eliminate wheel torque fluctuation. The passive neutral mode test results provide an accurate road load calculation for hybrid electric vehicles while eliminating the need of an additional vehicle and powering down several driver assist systems during a coast-down mode test procedure.

Figure 7:
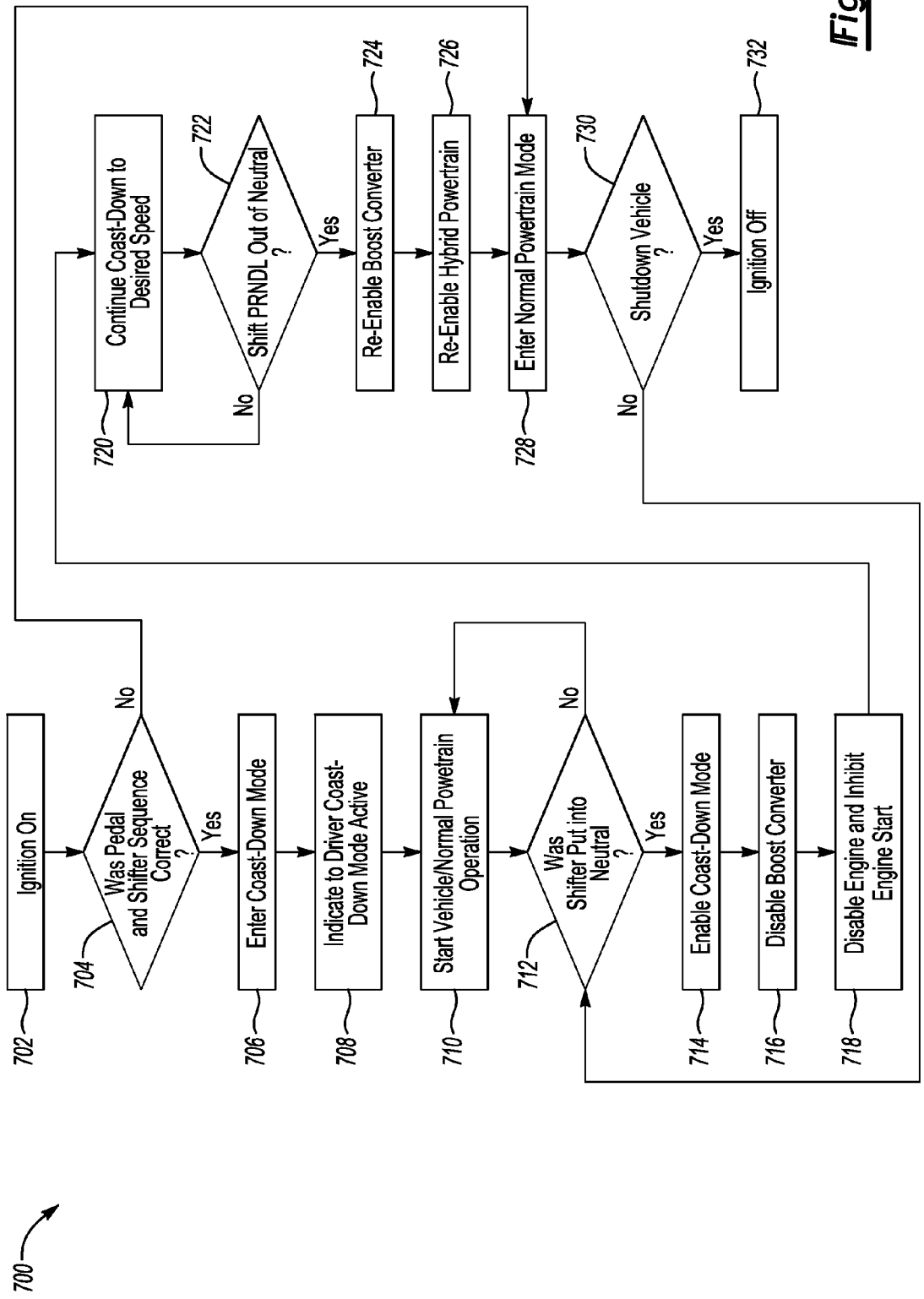
FIG. 7 is a flow chart of an algorithm for disabling and re-initializing a boost converter when controlling a coast-down mode for a hybrid vehicle.

FIG. 7 is a flow chart of an algorithm for disabling and re-initializing a boost converter when controlling a coast-down mode for a hybrid vehicle. The algorithm 700 for enabling a passive neutral mode during coast-down for road-load determination may be used in one or more hybrid powertrain configurations having a boost converter. The boost converter may be used to increase the voltage and reduce the number of battery cells in a hybrid electric vehicle.

At step 702, the vehicle computing system may begin the enabling of the hybrid electric vehicle when ignition on is detected. The ignition on event of the hybrid electric vehicle powertrain system may begin the initialization of one or more controllers and circuits including, but not limited to, an engine controller module, a transmission control module, a hybrid control module, a battery system module, and a boost converter circuit. A vehicle occupant may begin a sequence of accelerator and/or brake pedal maneuvers within a calibratable amount of time after the vehicle ignition is on to begin initialization to enter the passive neutral mode for a coast-down procedure at step 704.

For example, the driver may fully depress the brake pedal after a minimum predetermined amount of time, but before a maximum predetermined amount of time, from when the ignition is turned on. The driver may hold the fully depressed brake pedal for a calibrated period of time before releasing it so that it returns to its initial resting position. After the release of the brake pedal, the driver must set the PRNDL to the low gear and fully depress the accelerator pedal within a calibratable amount of time. The driver must then release the accelerator pedal after a minimum predetermined amount of time but before a maximum predetermined amount of time from when the PRNDL was placed into low gear. Once the driver releases the accelerator pedal, within a calibratable amount of time, he must set the PRNDL to the park gear. If the pedal and shifter sequence is correct, the vehicle computing system should now indicate coast-down mode is initiated in stand-by mode.

At step 704, if the pedal and shifter sequence was incorrect or not done within the respective calibratable amount of time, then the powertrain system may operate in a normal state without the coast-down mode being activated. The normal powertrain mode may be activated by the vehicle computing system and not allow the driver to re-enter the coast-down mode pedal sequence to initiate the feature until the ignition is cycled at step 726.

At step 706, if the pedal and shifter sequence were correct, the vehicle computing system may enter into a coast-down algorithm that is in standby until the system receives further signals from a driver. The system may indicate a coast-down test feature is in standby mode by flashing a malfunction indication lamp (MIL) a predefined number of flashes in a predefined amount of time at step 708. The vehicle computing system may allow the coast-down mode to be active until ignition is selected to OFF or a calibratable timer expires.

At 710, the system may require starting the vehicle within a calibratable amount of time of the MIL flashing to enable the coast-down test feature to be in standby mode during normal powertrain operation. The vehicle may be driven normally with the driver shifting the PRNDL to the reverse and/or drive gear(s) at step 712. Since the coast-down mode has been initiated by the driver performing the pedal and shifter sequence while starting the vehicle within a calibratable amount of time after the MIL light has flashed, the vehicle computing system may allow activating the hybrid electric vehicle coast-down test function based on one or more variables. The one or more variables to activate the coast-down mode may include, but are not limited to, setting the PRNDL to neutral after being in drive at step 712. Once the driver shifts the PRNDL to neutral, the system may command the passive neutral coast-down mode to be enabled at step 714.

At step 716, the vehicle computing system may initiate the coast-down mode feature by disabling one or more controllers and/or circuits including, but not limited to, the boost converter circuit. The disabling of the boost converter circuit may halt the voltage being delivered to the inverters that power the one or more electric machines. The one or more controllers being disabled when the passive neutral coast-down mode is activated may include the engine, transmission, and inverter control module. The disabling of the engine control module may shut down the engine and inhibit the hybrid powertrain system from starting the engine at step 718. The vehicle computing system may operate other vehicle system and subsystems while allowing continuous communication using the CAN bus during the enabled passive neutral coast-down mode. For example, the vehicle computing system may allow the assisted power steering system to continuously operate while the vehicle is in the coast-down mode.

The vehicle computing system disabling one or more modules eliminates the powertrain system from actively attempting to control torque during a coast-down procedure. The vehicle computing system may attempt to control torque in real time having a certain error and may change over time. The control torque error from a hybrid powertrain system may include, but not be limited to, one or more sensors having variability from part-to-part, control errors due to digital sampling times, errors in calibration maps for a particular set of motors, and torque production variation from the motors themselves (e.g., the motors magnetic field strength). The elimination of these errors by disabling the engine and the one or more electric machines may improve the coast-down measurements of a vehicle by allowing a powertrain system to be in a passive state.

At step 720, the vehicle may continue to coast-down allowing the calculation of road-load coefficients to be more accurate by disabling the electric machine and engine, therefore eliminating their large rotating inertia and electrical losses therein which affect the determination of true vehicle road loads. Once the coast-down procedure is complete, the driver may shift the PRNDL out of neutral to abort the passive neutral coast-down mode at step 722. In another example, the driver may want to abort the coast-down mode before completing the procedure by moving the gear selector out of neutral.

Once the system detects an abort signal, the vehicle computing system may begin to re-initialize the one or more controllers and/or circuits that were disabled during the passive neutral coast-down mode. The vehicle computing system transitioning the powertrain form a passive state to an active state may cause problems and potential hardware failures if not managed properly. Therefore, re-enabling the boost converter requires re-initialization voltage control. The vehicle computing system may re-enable the boost converter circuit at step 724. The re-enabling of the boost converter, which during an ignition on cycle of the hybrid powertrain system does not turn off under normal powertrain operation, may require controlling voltage on the high side as the traction battery voltage is dictated on the low side. The system may control the high side voltage during the re-enabling/re-initialization of the boost converter to match the low side or commanding a fixed difference from high side to low side depending on the operation state of the electric machine(s).

For example, the system may enable the boost converter by driving the high side voltage to a predetermined target value which may be approximately equal to the voltage of the traction battery, wherein the predetermined target value may be calibrated based on the speed of the electric machine(s). The one or more calibrations associated with the predetermined target values for re-enabling the boost converter (and/or inverter module) based on the electric machine speed may have a relation such that the predetermined target increases as the speed increases. The one or more electric machines may have a high speed therefore it may be easy to control a motor and/or generator versus a low speed scenario. The boost converter may be controlled to a pass through state therefore allowing the vehicle computing system an easier path to control the one or more electric machines at lower speeds with lower voltage.

Once the boost converter is enabled, the vehicle computing system may command the motor and/or generator inverter at the same time. During the re-initialization of the hybrid powertrain system, the vehicle computing system may actively control the one or more electric machines torque to a near zero value with a predetermined duty cycle of the power electronic switching devices (e.g., transistors, insulated-gate bipolar transistor, etc.) in the electric machine's inverter module. The control system may control the induced current to zero as an initial step of the re-initialization of the one or more electric machines to provide a consistent starting point when reinitializing the hybrid system.

The resumption of normal powertrain torque commands may be resumed after the induced current is effectively under control (i.e., controlled sufficiently close to zero). This is a decision of the hybrid powertrain control system to start producing a non-zero torque command that may then result in different duty cycles of the power electronics switching devices.

At step 726, after the coast-down feature has been disabled, the hybrid powertrain system may control the one or more control modules and circuits to command power from the electric machine(s) and engine. The vehicle computing system may enter a normal powertrain mode by enabling all hybrid powertrain functions at step 728.

At step 730, the driver may continue to repeat the road-load determination procedure as much as he or she would like during that key cycle of the vehicle computing system and/or drive in the normal powertrain mode with the coast-down mode active in standby. The driver may operate the vehicle in the normal powertrain mode by avoiding shifting the PRNDL in neutral. The driver may turn the ignition off to disable the coast-down mode at step 732.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a vehicle computer programmed to
receive a request to enable a passive neutral mode during an accessory mode,
in response to an activate signal for the passive neutral mode during vehicle operation, pull-down an engine and inhibit engine pull-up, and disable an electric machine such that the vehicle coasts and,
in response to a deactivate signal, enable engine pull-up and enable the electric machine such that the vehicle resumes drive.

2. The vehicle of claim 1, wherein the request is based on a predetermined sequence of accelerator pedal and shifter inputs.

3. The vehicle of claim 1, wherein disabling the electric machine includes powering down an associated inverter and variable voltage controller.

4. The vehicle of claim 1, wherein pulling-down the engine includes powering down an associated engine control module.

5. The vehicle of claim 1, wherein the active signal is generated in response to movement of a gear selector to a neutral gear position.

6. The vehicle of claim 1, wherein the deactivate signal is generated in response to movement of a gear selector to a drive gear position.

7. A method for controlling a hybrid electric vehicle comprising:
receiving, via a vehicle computer, a request to enable a passive neutral mode during an accessory mode;
in response to an activate signal for passive neutral mode, shutting down an engine mechanically coupled to an electric machine of a non-selectable-gear transmission and inhibiting re-start of the engine, and disabling the electric machine such that the vehicle coasts; and
in response to a deactivate signal, permitting re-start of the engine and enabling the electric machine such that the vehicle resumes drive.

8. The method of claim 7 wherein the request is based on a predetermined sequence of accelerator pedal and shifter inputs.

9. The method of claim 7, wherein disabling the electric machine includes powering down an associated inverter and variable voltage controller.

10. The method of claim 7, wherein shutting down the engine includes powering down an associated engine control module.

11. The method of claim 7, wherein the active signal is generated in response to movement of a gear selector to a neutral gear position.

12. The method of claim 7, wherein the deactivate signal is generated in response to movement of a gear selector to a drive gear position.

13. A non-transitory computer-readable storage medium storing instructions that, when executed by at least one processor, cause the at least one processor to perform the method comprising:
receiving a request during an accessory mode to enable a passive neutral mode;
in response to an activate signal for passive neutral mode in a vehicle, (i) pulling-down an engine mechanically coupled to an electric machine of a non-selectable-gear transmission and inhibiting engine pull-up and (ii) disabling the electric machine such that the vehicle coasts; and
in response to a deactivate signal, do not inhibit engine pulling-up and enabling the electric machine such that the vehicle resumes drive.

14. The non-transitory computer-readable storage medium of claim 13, wherein the request is based on a predetermined sequence of accelerator pedal and shifter inputs during accessory mode to enable the passive neutral mode.

15. The non-transitory computer-readable storage medium of claim 13, wherein disabling the electric machine includes powering down an associated inverter and variable voltage controller.

16. The non-transitory computer-readable storage medium of claim 13, wherein pulling-down the engine includes powering down an associated engine control module.

17. The non-transitory computer-readable storage medium of claim 13, wherein the active signal is generated in response to movement of a gear selector to a neutral gear position.

18. The non-transitory computer-readable storage medium of claim 13, wherein the deactivate signal is generated in response to movement of a gear selector to a drive gear position.

* * * * *